United States Patent [19]

Aoyama

[11] Patent Number: 4,930,899
[45] Date of Patent: Jun. 5, 1990

[54] DOUGH STUFF KNEADER

[75] Inventor: Michishige Aoyama, Nagoya, Japan

[73] Assignee: Kabushiki Kaisha Kaisha Toshiba, Kawasaki, Japan

[21] Appl. No.: 210,377

[22] Filed: Jun. 23, 1988

[30] Foreign Application Priority Data

Jun. 29, 1987 [JP] Japan .................. 62-162655

[51] Int. Cl.$^5$ .................. B01F 15/06; A47J 27/00
[52] U.S. Cl. .................. 366/98; 99/348; 366/100; 366/144; 366/601
[58] Field of Search .................. 366/69, 96, 97, 98, 366/99, 100, 144, 145, 601, 100; 99/348

[56] References Cited

U.S. PATENT DOCUMENTS

| | | | |
|---|---|---|---|
| 4,277,183 | 7/1981 | Shinriki | 366/98 |
| 4,457,629 | 7/1984 | Liaw | 366/143 |
| 4,538,509 | 9/1985 | Ojima | 366/144 |
| 4,613,086 | 9/1986 | Granum | 366/97 |
| 4,762,057 | 8/1988 | Hirota | 366/98 |

FOREIGN PATENT DOCUMENTS 61-30385 2/1986 Japan .

Primary Examiner—Robert W. Jenkins
Attorney, Agent, or Firm—Foley & Lardner, Schwartz, Jeffery, Schwaab, Mack, Blumenthal & Evans

[57] ABSTRACT

The disclosure relates to a dough stuff kneader for kneading dough stuffs contained in a container by driving an electric motor. The dough stuff kneader includes an electrical fan for inducing an air flow which is introduced into the container, thereby cooling the dough stuffs. The kneading motor is driven in accordance with a kneading command signal delivered from a microcomputer as a signal generating circuit. The electrical fan is driven in accordance with a blowing command signal delivered from a timer circuit. The timer circuit is designed so as to deliver a blowing command signal after elapse of a predetermined period of time from the time when the kneading command signal is delivered from the microcomputer.

5 Claims, 2 Drawing Sheets

DOUGH STUFF KNEADER

BACKGROUND OF THE INVENTION

1. Field of the Invention

The present invention relates to a dough stuff kneader for bread making apparatus, wherein dough stuffs including wheat flour, bread yeast, water and the like are kneaded to obtain dough.

2. Description of the Prior Art

Automatic bread making apparatuses for home use have recently been commercially produced. In such automatic bread making apparatuses, a series of operational steps for making bread such as the kneading and fermenting of the dough stuffs and baking, are automatically performed. A dough stuff kneader incorporated in the automatic bread making apparatus for home use includes a container having an upper opening and a kneading blade disposed within the container and mounted on a rotational shaft of an electric motor. When the motor is driven, the kneading blade is rotated. The dough stuffs, such as wheat flour, bread yeast, water and the like, contained in the container are kneaded and subsequently, a fermenting step is executed in the container, thereby producing dough. The dough is then baked in the container by means of an electric heater.

In the above-described dough stuff kneader, however, frictional heat induced in the kneading operation step causes the temperature of the dough stuffs to gradually increase while the dough is being made. The temperature of the dough stuffs is increased greatly when ambient temperature is high, as in summer. When the temperature of the dough stuffs increases, the dough stuffs ferment excessively. Such excessive fermentation of the dough stuffs prevents fine bread from being obtained.

One method of preventing excessive fermentation of the dough stuffs is to cool the dough stuffs contained in the container by a fan means in the kneading operation step. However, when air is directly blown against the dough stuffs in the container, a part of the wheat flour not kneaded tends to be blown upwardly, flying out of the container. On the other hand, when air is blown against the outer surface of a container side wall so that the dough stuffs are indirectly cooled, the cooling efficiency may be reduced and electrical power consumption is increased.

SUMMARY OF THE INVENTION

Therefore, an object of the present invention is to provide a dough stuff kneader which is provided with fan means preventing the temperature increase of dough stuffs owing to frictional heat induced in the step of kneading the dough stuffs, thereby preventing the excessive fermentation of dough stuffs.

Another obrject of the present invention is to provide a dough stuff kneader wherein a part of the dough stuffs may be prevented from being blown upward owing to air flow induced by the fan means.

In various of these objects and others, the dough stuff kneader in accordance with this invention comprises a container for dough stuffs, an electric motor for kneading the dough stuffs contained in the container, and fan means for introducing air flow into the container. The kneading motor is driven in response to a kneading command signal delivered from a signal generating circuit. The fan means is driven in response to a blowing command signal delivered from a timer circuit after elapse of a predetermined period of delay time after output of the kneading command signal.

In accordance with the above-described construction, air flow induced by the fan means is introduced into the container and accordingly, the dough stuffs being kneaded in the container is cooled down, thereby preventing the temperature increase of the dough stuffs owing to the frictional heat induced in the kneading operation. Since the air flow induced by the fan means is directly introduced into the container, the cooling efficiency may be improved. Additionally, when the predetermined period of delay time set at the timer circuit elapses after drive of the kneading motor starts in accordance with the kneading command signal, the blowing command signal is delivered from the timer circuit. More specifically, when the kneading operation progresses in some degree with the wheat flour mixed with water, the operation of the fan means starts. Consequently, the wheat flour contained in the container may be prevented from being blown upward.

Other and further objects of the present invention will become obvious upon an understanding of the illustrative embodiment about to be described or will be indicated in the appended claim, and various advantages not referred to herein will occur to one skilled in the art upon employment of the invention in practice.

DESCRIPTON OF THE PREFERRED EMBODIMENT

Figure 3:
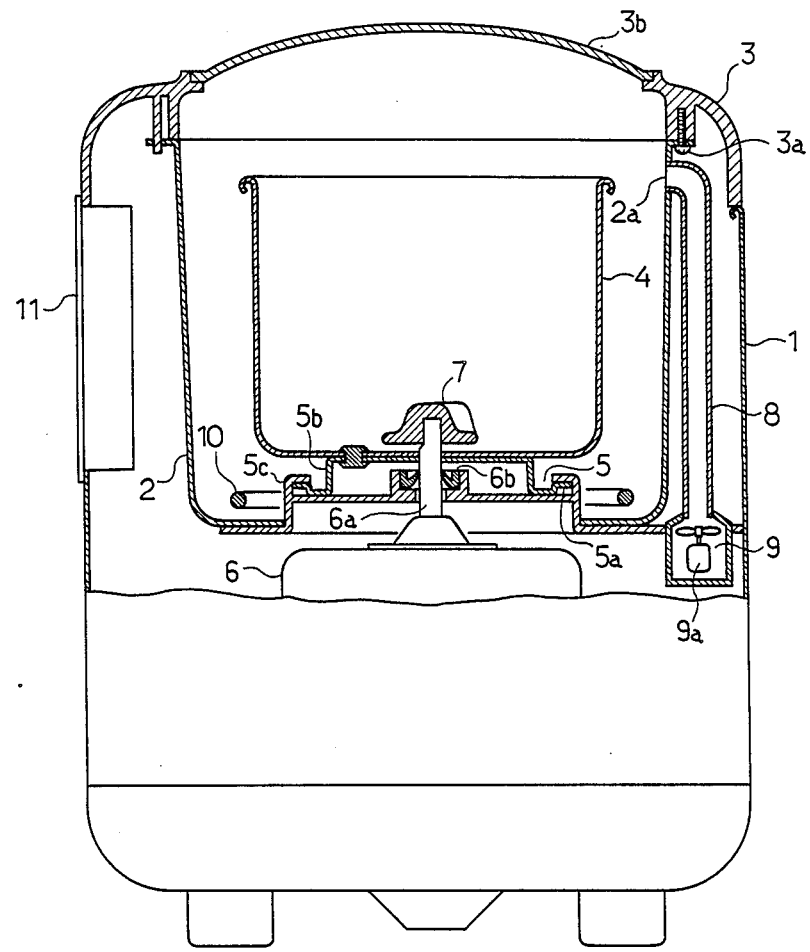
FIG. 3. is a partially broken-away side view of the break making apparatus.

In the following description of an embodiment, the dough stuff kneader of this invention is applied to an automatic bread making apparatus for home use. Referring first to FIG. 3 of the drawings, reference numeral 1 indicates a rectangular outer case constituting an outer frame. A rectangular inner case 2 is provided within the outer case 1. The inner lower space defined by the inner lower wall and the bottom wall of the case 2 is utilized for disposing several parts which will be described hereinafter. The inner case 2 has a circumferentially extending upper flange to which a lid support 3 is secured by screws 3a, one of them being shown. A lid 3b is received by the lid support 3. A rectangular container 4 is detachably mounted in the inner case 2 with a bayonet mechanism 5 interposed therebetween. The container 4 has an upper opened through which dough stuffs including wheat flour, bread yeast and water are fed into the container 4. A bread making operation, including kneading, fermentation, and baking operation steps, is performed in the container 4. The bayonet mechanism 5 well knonw in the art comprises a bayonet plug 5b secured to the outer bottom of the container 4 and having a claw 5a and a bayonet socket 5c secured to the inner bottom of the inner case 2. An electric motor 6 for the kneading operation is disposed in the part disposing space provided at the inner lower portion of the outer case 1. A rotational shaft 6a of the motor 6 is vertically projected through openings formed in the bottom of the container 4, the plug 5b and socket 5c, respectively. A sealing member 6b is provided around the portion of the plug 5b, through which portion the rotational shaft 6a of the motor 6 being projected.

An air flow feed pipe 8 is provided in the space between the outer case 1 and the inner case 2. An upper end opening of the air flow feed pipe 8 communicates to an air feed opening 2a formed in the upper portion of the inner case 2. The air feed opening 2a is formed so as to be approximately on the level with the upper edge of the container 4. Fan means 9 is provided so as to face the lower opening of the air feed pipe 8. Drive of the fan means 9 causes air flow, which is introduced through the air feed pipe 8 and the air feed opening 2a into the container 4. A heater 10 for fermenting and baking operations is provided on the inner bottom of the inner case 2. A control unit 11 mounted on the side wall of the outer case 1 comprises electrical circuit elements for controlling a series of operation steps such as the kneading and fermenting of the dough stuffs and the baking.

Figure 1:
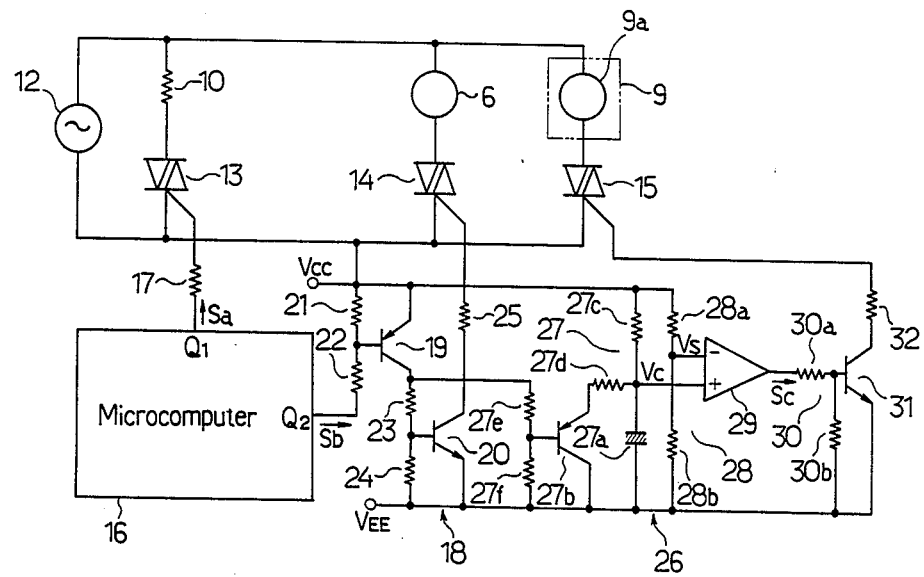
FIG. 1 is an electrical circuit diagram of an automatic bread making apparatus to which the dough stuff kneader of this invention is applied.

Referring now to FIG. 1 illustrating the electrical arrangement of the control unit 11, the heater 10 is connected across an AC power supply 12 through an bidirectional triode thyrister or triac 13. The motor 6 for the kneading operation is connected across the AC power supply 12 through a triac 14. A fan motor 9a incorporated in the fan means 9 is connected across the AC power supply 12 through a triac 15. Each of the triacs 13, 14 and 15 is designed to be triggered in the condition that a low level signal is supplied to a gate terminal thereof. Reference numeral 16 indicates a microcomputer serving as a signal generating circuit. A heating command signal Sa for energizing the heater 10 and a kneading command signal Sb for driving the motor 6 are delivered from respective output terminals Q1 and Q2 of the microcomputer 16 in the timing based on a program prestored therein. Since the levels of the signals Sa and Sb at the respective output terminals Q1 and Q2 are reduced to the potential level of the grounding line by the microcomputer 16, the signals Sa and Sb are delivered as low level signals. Especially, the heating command signal Sa, delivered from the output terminal Q1 of the microcomputer 16, is supplied to the gate terminal of the triac 13 through a resistor 17. Upon receipt of the heating command signal Sa, the triac 13 is turned on, thereby energizing the heater 10.

The kneading command signal Sb delivered from the output terminal Q2 of the microcomputer 16, is supplied to a trigger circuit 18. The trigger circuit 18 comprises a PNP transistor 19, an NPN transistor 20, and resistors 21–25. A pair of DC power supply terminals $V_{CC}$ and $V_{EE}$ constitute output terminals of a DC power supply circuit rectifying the output of the AC power supply 12. The DC power supply terminal $V_{CC}$ is connected to the AC power supply 12 and the other DC power supply terminal $V_{EE}$ is connected to the grounding line. The resistors 21 and 22 are series connected between the DC power supply terminal $V_{CC}$ and the output terminal Q2 of the microcomputer 16. The base of the PNP transistor 19 is connected to the common connection of the resistors 21 and 22 and the emitter thereof is connected to the DC power supply terminal $V_{CC}$. The collector of the PNP transistor 19 is connected to the DC power supply terminal $V_{EE}$ through a series circuit comprising the resistors 23 and 24. The base of the NPN transistor 20 is connected to the common connection of the resistors 23 and 24 and the collector thereof is connected to the gate terminal of the triac 14 through the resistor 25. The emitter of the NPN transistor 20 is connected to the DC power supply $V_{EE}$. When the kneading command signal Sb is delivered from the output terminal Q2 of the microcomputer 16, the transistors 19 and 20 are turned on, in turn, thereby supplying the low level signal to the gate terminal of the triac 14. As a result, the triac 14 is turned on and then the kneading motor 6 is energized.

Reference numeral 26 indicates a timer circuit. The timer circuit 26 employs a charging period of time for a capacitor 27a in a charge and discharge circuit 27 as a timing element. The charge and discharge circuit 27 comprises a PNP transistor 27b and resistors 27c, 27d, 27e, 27f other than the capacitor 27a. One end of the capacitor 27a is connected to the DC power supply terminal $V_{CC}$ through the resistor 27c and the other end thereof is connected to the DC power supply terminal $V_{EE}$. The common connection of the capacitor 27a and the resistor 27c is connected to the emitter of the PNP transistor 27b through the resistor 27d. A series circuit comprising the resistors 27e and 27f is connected between the collector of the PNP transistor 19 and the DC power supply terminal $V_{EE}$. The common connection of the resistors 27e and 27f is connected to the base of the PNP transistor 27b and the collector of the transistor 27b is connected to the DC power supply terminal $V_{EE}$. Consequently, the PNP transistor 27b is turned on only when the PNP transistor 19 is turned off, that is, when no kneading command signal Sb is delivered from the output terminal Q2 of the microcomputer 16. The PNP transistor 27b is turned off when the PNP transistor 19 is turned on.

Reference numeral 28 indicates a regulator circuit comprising resistors 28a and 28b connected in series to each other between the DC power supply terminals $V_{CC}$ and $V_{EE}$. A reference voltage Vs is delivered from the common connection of the resistors 28a and 28b. A comparator 29 is designed to compare the reference voltage Vs from the regulator circuit 28 with a terminal voltage Vc of the capacitor 27a. An output of the comparator 29 is turned to a high level signal where Vs < Vc. The high level signal is delivered as a blowing command signal Sc.

A transistor bias circuit 30 comprises resistors 30a and 30b series connected between the output terminal of the comparator 29 and the DC power supply terminal $V_{EE}$. A common connection of the resistors 30a and 30b is connected to the base of an NPN transistor 31. The collector of the NPN transistor 31 is connected to the gate terminal of the triac 15 through a resistor 32 and the emitter thereof is connected to the DC power supply terminal $V_{EE}$. As a result, when the blowing command signal Sc is delivered from the comparator 29, the transistor 31 is turned on to thereby supply a low level signal to the gate terminal of the triac 15, whereby the fan motor 9a is energized.

Figure 2:
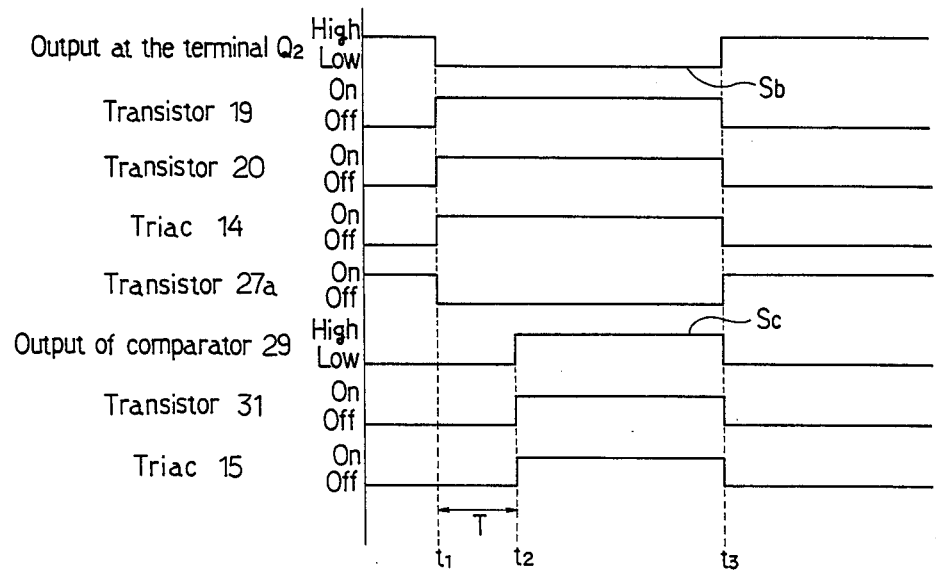
FIG. 2 is a timing chart for explanation of the operation of the embodied bread making apparatus.

Operation of the automatic bread making apparatus will now be described with reference to FIGS. 1 and 2. FIG. 2 illustrates the outputs of the kneading command signal Sb by the microcomputer 16 and of the blowing command signal Sc by the timer circuit 26 and on-states of the transistors 19, 20, 27b, 31 and triacs 14 and 15. When the kneading command signal Sb is delivered from the microcomputer 16 at time t1 with the dough stuffs including wheat flour, bread yeast and water contained in the container 4 as shown in FIG. 2, the transistors 19 and 20 of the trigger circuit 18 are turned on in turn and accordingly, the triac 14 is turned on, thereby energizing the kneading motor 6. The blade 7 is rotated to thereby knead the dough stuffs contained in the container 4. Since at time t1, the transistor 27b of the timer circuit 26 is turned off when the PNP transistor 19 is turned on, the charging to the capacitor 27a through the resistor 27c (that is, time counting operation of the timer circuit 26) starts. The charging causes the terminal voltage Vc of the capacitor 27a to rise. When the level of the terminal voltage Vc exceeds that of the reference voltage Vs from the regulator circuit 28 at time t2 after elapse of a predetermined period of time from time t1, the blowing command signal Sc is delivered from the comparator 29. Consequently, the NPN transistor 31 is turned on, thereby turning the triac 15 on. Upon turn-on of the triac 15, the fan motor 9a is energized and the fan means 9 is driven to introduce through the upper open end therof, an air flow into the container 4, in which the dough stuffs are being kneaded. As a result, the temperature of the dough stuffs may be prevented from being raised owing to the frictional heat induced during the kneading operation. Subsequently, when the output of the kneading command signal Sb is stopped to complete the kneading operation step (at time t3 in FIG. 2), the transistors 19 and 20 are turned off in turn, thereby deenergizing the motor 6. Additionally, when the PNP transistor 19 is turned off, the PNP transistor 27b is turned on. As a result, since the capacitor 27a is discharged through the resistor 27d and transistor 27b, the terminal voltage Vc thereof is dropped. Consequently, since the comparator 29 stops delivering the blowing command signal Sc, the triac 15 is turned off, thereby deenergizing the fan motor 9a. The drive of the fan means 9 is thus stopped. Subsequently, the triac 13 and hence, the heater 10 is controlled in accordance with the heating command signal delivered from the microcomputer 16 to thereby execute the fermenting and baking operation steps in turn.

According to the above-described embodiment, since the air flow induced by the fan means 9 is introduced into the container 4 in which the kneading operation step is executed, the dough stuffs being kneaded in the container 4 is cooled, thereby preventing excessive fermentation of the dough stuffs. Since the air flow is directly introduced into the container 4, the cooling efficiency may be improved. Furthermore, when the predetermined period of time T elapses from the start of the kneading operation step, that is, only when the kneading operation progresses in some degree with the wheat flour being mixed with water, the fan means 9 is driven, thereby preventing the wheat flour from being blown up.

Although the timer circuit 26 is formed into a discrete circuit in the foregoing embodiment, functions of the timer circuit 26 may be attained by making use of an inner counter of the microcomputer 16. Furthermore, although the fan means 9 is provided so that the air flow is introduced from one side of the container 41 thereinto, a guide member may be provided so as to guide the air flow over the container 4 and to introduce the air flow from over the container 4 thereinto.

The foregoing disclosure and drawings are merely illustrative of the principles of the present invention and are not to be interpreted in a limiting sense. The only limitation is to be determined from the scope of the appended claim.

What is claimed is:

1. A dough stuff kneader comprising:
   (a) a container for containing dough stuffs at least including water and wheat flour, said container having an upper end which is kept in the open state at least during kneading step;
   (b) an electric motor for kneading the dough stuffs contained in said container;
   (c) fan means for providing air flow to the interior of said container through the open upper end thereof in the open state;
   (d) a signal generating circuit for generating a kneading command signal for driving said motor; and
   (e) a timer circuit generating a blowing command signal for driving said fan means, after elapse of a predetermined period from the time when the kneading command signal is generated by said signal generating circuit, said predetermined period corresponding to a period for which the dough stuffs are kneaded into a dumpling state, whereby the wheat flour is prevented from being blown out of the container when exposed to the air flow from the fan means.

2. The dough stuff kneader of claim 1, in which the signal generating circuit is controlled by a microcomputer.

3. A process for kneading dough stuffs, including the steps of:
   (a) placing dough stuffs to be kneaded in a container having an open upper end;
   (b) energizing an electric motor to knead the dough stuffs in the container;
   (c) providing an air flow to the dough stuffs through the open upper end of the container; and
   (d) controlling the commencement and termination of the air flow by means of a timing circuit; the air flow commencing at a predetermined time after the commencement of kneading.

4. The process of claim 3, in which termination of the air flow occurs no later than the termination of kneading.

5. The process of claim 3, in which the timing of the airflow is controlled by a microcomputer.

* * * * *